(12) United States Patent
Dorschky

(10) Patent No.: US 6,636,532 B1
(45) Date of Patent: Oct. 21, 2003

(54) APPARATUS FOR ADJUSTING PHASE

(75) Inventor: Claus Dorschky, Eckental (DE)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/375,647

(22) Filed: Aug. 17, 1999

(30) Foreign Application Priority Data

Aug. 21, 1998 (EP) .............................. 98306713

(51) Int. Cl.⁷ ................................. H04J 3/02
(52) U.S. Cl. ....................... 370/537; 370/541
(58) Field of Search .................. 370/541, 516–518, 370/537, 539, 540, 538, 535

(56) References Cited

U.S. PATENT DOCUMENTS 4,955,040 A      9/1990  Sarkoezi ................... 375/119
4,970,719 A  *  11/1990  Takase et al. ................. 370/84
5,111,455 A      5/1992  Negus ........................ 370/112
5,726,990 A  *  3/1998   Shimada et al. ............ 370/536

FOREIGN PATENT DOCUMENTS

| EP | 88309353.6 | 10/1988 | ............. H04J/3/04 |
| WO | WO 94/00934 | 1/1994 | ............. H04J/3/04 |

OTHER PUBLICATIONS

European Search report dated Feb. 4, 1999.

* cited by examiner

Primary Examiner—Wellington Chin
Assistant Examiner—Brenda Pham

(57) ABSTRACT

In a network where frequency synchronous lower bit rate signals are combined to form a high bit rate signal by using hierarchies of multiplexers, i.e., concatenated multiplexers of different bit rate levels, an apparatus is provided for adjusting the phase deviations that occur between data input signals and a common clock signal. In one embodiment, the apparatus includes delay lines for delaying the input signals of the multiplexers of the lower hierarchies.

9 Claims, 1 Drawing Sheet

APPARATUS FOR ADJUSTING PHASE

CROSS-REFERENCE TO RELATED APPLICATION

This application claims priority of European Patent Application No. 98306713.3, which was filed on Aug. 21, 1998.

TECHNICAL FIELD

This invention relates generally to the field of phase correlation and, more particularly, to correlating the phases of a clock signal and data signals.

BACKGROUND OF THE INVENTION

In high bit rate networks frequency synchronous lower bit rate data signals are combined by multiplexers to form the high bit rate signal. Often hierarchies of multiplexers are used to form the high bit rate signal, i.e., multiplexers of different bit rate levels are concatenated. In a first hierarchy from low bit rate data signals medium bit rate data signals are formed which then are multiplexed to a high bit rate data signal by a multiplexer of a second hierarchy. Usually all data signals of a common hierarchy are frequency synchronous. After forming the medium bit rate data signals, multiplexing them to the high bit rate data signal causes a problem, because the medium bit rate data signals often show a phase deviation from the common frequency used for multiplexing, i.e., a phase deviation from a common clock signal.

The phase deviation can be adjusted by using a phase correlator and a delay line for phase adjusting the medium bit rate data signals to the common clock signal of the medium bit rate data signals. But adjusting the phase deviation for the medium bit rate data signals causes problems, because an apparatus for adjusting the phase deviations of the medium bit rate data signals to the common clock signal has to operate at relatively high frequencies.

SUMMARY OF THE INVENTION

According to the principles of the invention, an apparatus is provided for correlating phases of a clock signal and data signals to adjust for phase deviations in a network having multiplexers of a first hierarchy concatenated with multiplexers of at least one higher hierarchy. More specifically, the apparatus according to the principles of the invention includes means for correlating phases of the clock signal and data signals of the higher hierarchy, to generate control signals indicative of a phase deviation of the data signals to the clock signal of the higher hierarchy, delay means controlled by the control signals to adjust for the phase deviation of the data signals to the clock signal of the higher hierarchy, whereat the delay means at least delay one input signal of each multiplexer of a lower hierarchy.

An advantage of the present invention is that it allows correction of the phase deviation of each data input of the multiplexer of the highest hierarchy separately. Another advantage of the present invention is that the phase adjustment is effected at a location in the multiplexing hierarchy which is at least one hierarchical level below where the phase deviation occurs. As the adjustment of the phase deviation thus is effected for a lower bit rate signal, less timing critical circuitry can be used to achieve the phase adjustment, as the clock phase margin at re-timing D-flip-flops usually used in the multiplexers is more relaxed.

BRIEF DESCRIPTION OF THE DRAWING

A more complete understanding of the present invention may be obtained from consideration of the following detailed description of the invention in conjunction with the drawing, in which.

DETAILED DESCRIPTION OF THE INVENTION

Figure 1:
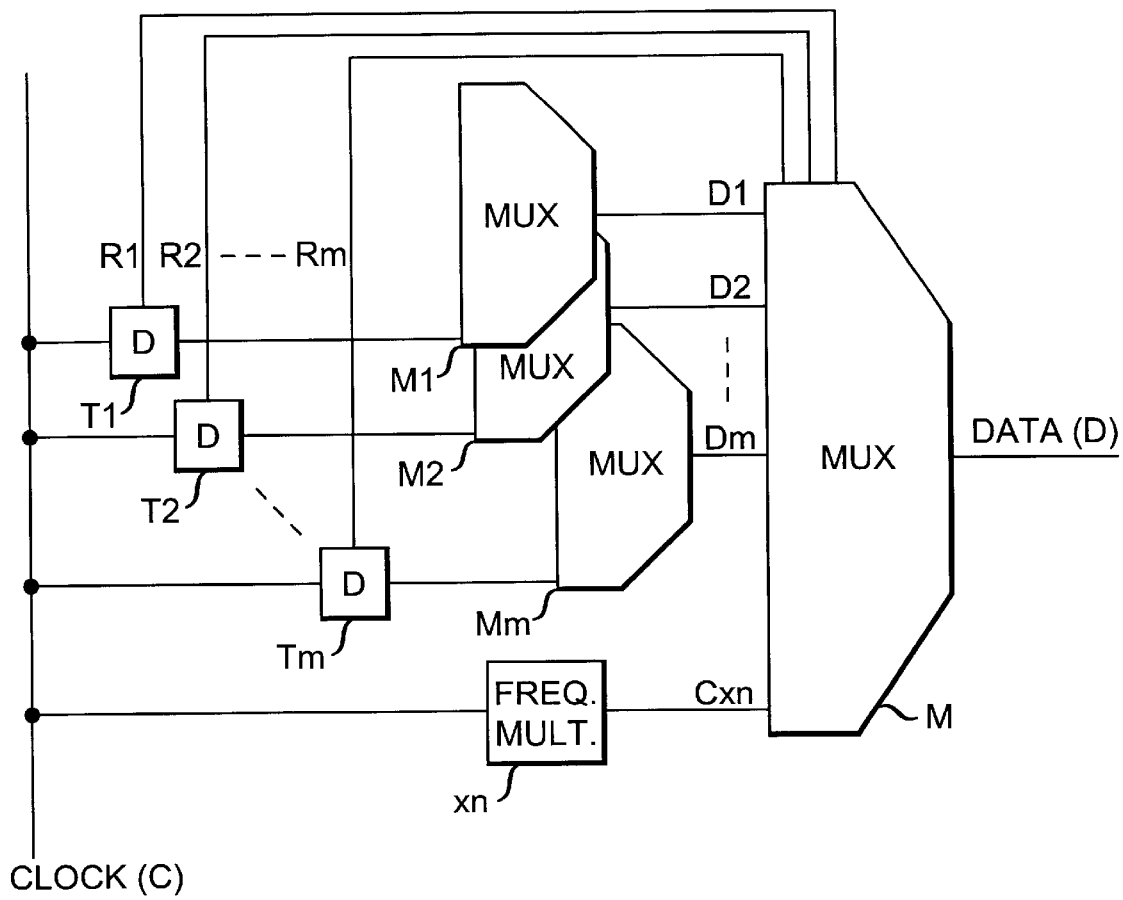
FIG. 1 shows an exemplary embodiment of an apparatus for combining low bit rate data signals to form a high bit rate data signal according to the principles of the invention.

Depicted in FIG. 1 is an apparatus for combining low bit rate data signals to form a high bit rate data signal. The apparatus has a common first clock signal C which is coupled to adjustable delay means, e.g., delay lines, T1 to Tm. The output of the delay lines T1 to Tm are coupled to inputs of multiplexers M1 to Mm respectively, which form a first multiplexing hierarchy. The multiplexers M1 to Mm each have n inputs, for example, for inputting n low bit rate data signals all being frequency synchronous. The n inputs of the multiplexers M1 to Mm and the low bit rate data signals are not shown for reason of simplicity, as they are not relevant for the understanding of the present invention. At outputs of the multiplexers M1 to Mm medium bit rate data signals D1 to Dm respectively are available. The multiplexing of the n low bit rate data signals by each of the multiplexers M1 to Mm is clocked by the common first clock signal C via the delay lines T1 to Tm respectively. The medium bit rate data signals D1 to Dm are coupled to m inputs of a multiplexer M which combines the m medium bit rate data signals to a high bit rate data signal D, forming a second multiplexing hierarchy. The multiplexing of the m medium bit rate data signals is clocked by a second clock signal Cxn which is generated from the first clock signal C by a frequency multiplier xn. To avoid phase deviations between the medium bit rate data signals D1 to Dm to the second clock signal Cxn, control signals R1 to Rm are generated by the multiplexer M to control the delay time of the delay lines T1 to Tm respectively.

Figure 2:
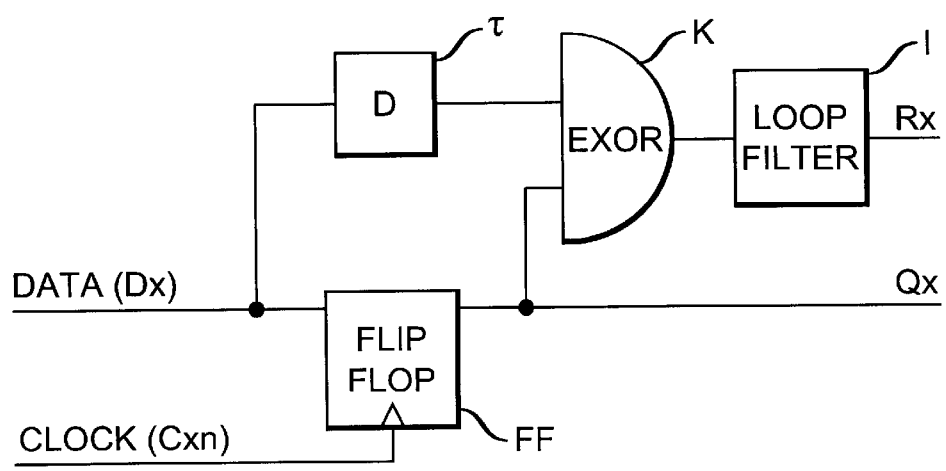
FIG. 2 shows an exemplary embodiment of a means for generating a control signal to adjust a phase deviation according to the principles of the invention.

Depicted in FIG. 2 is a means for generating a control signal for adjusting phase deviations of the input signals of the multiplexer M, as explained above. There are m means as depicted in FIG. 2 present in multiplexer M, i.e., for each medium bit rate data signal D1 to Dm one such means is provided to form the control signals R1 to Rm. The means for generating the control signal has two inputs, one for the medium bit rate data signal Dx and a second one for the second clock signal Cxn. The input signals are fed to a data acquisition means FF, e.g., a D-flip-flop. The medium bit rate data signal Dx is coupled to a data input of the flip-flop FF, the clock signal Cxn 15 is coupled to a clock input of the flip-flop FF, to allow the data acquisition or transfer of data stemming from the medium bit rate data signal Dx to an output Qx of the flipflop FF. The output signal Qx is one of the m signals fed to the multiplexer M to be multiplexed to form the high bit rate data signal D. The flip-flop FF itself is already present, as it is part of the multiplexer M.

The input signal Dx and the output signal Qx of the flip-flop are coupled to a phase correlator K, e.g., an EXOR gate. To compensate for the propagation time of the flipflop FF a delay circuit τ, e.g. a delay line or a buffer, can be provided to couple the input signal Dx to the EXOR gate K. As the output signal Qx of the flip-flop FF is subject to the clock signal Cxn, the output signal of the EXOR gate K is a measure for the phase deviation between the data signal Dx and the clock signal Cxn. An output of the EXOR gate K is coupled to a loop filter I, e.g., an integrating filter, to form a control signal Rx, which is fed to one of the delay lines T1 to Tm, as shown in FIG. 1.

By adjusting phase deviations in the way explained above, it is possible to correct the phase deviation of each data input D1 to Dm of the multiplexer M to the clock signal Cxn separately. The phase adjustment is effected at a location in the multiplexing hierarchy which is one hierarchical level below where the phase deviation occurs. As the adjustment of the phase deviation for the medium bit rate data signals D1 to Dm is effected at the side of the low bit rate data signals for the clock signal C, controlling the multiplexers M1 to Mm, which form the medium bit rate signals D1 to Dm, the phase adjustment is shifted to a less critical location.

The foregoing is merely illustrative of the principles of the invention. Those skilled in the art will be able to devise numerous arrangements, which, although not explicitly shown or described herein, nevertheless embody principles that are within the spirit and scope of the invention. For example, more than two multiplexing hierarchies can be present. Moreover, phase deviations can be adjusted by controlling delay lines that are coupled to multiplexers not being direct predecessors of the multiplexer of the highest multiplexing hierarchy. Accordingly, the scope of the invention is limited only by the claims that follow.

What is claimed is:

1. An apparatus for correlating phases of a clock signal and data signals to adjust phase deviations, comprising:

multiplexers of a first hierarchy being concatenated with multiplexers of at least one higher hierarchy;

means for correlating phases of a clock signal and data signals of said higher hierarchy, to generate control signals indicative of a phase deviation of said data signals to said clock signal of said higher hierarchy; and delay means controlled by said control signals to adjust for the phase deviation of said data signals to said clock signal of said higher hierarchy, whereat said delay means at least delay one input signal of each multiplexer of a lower hierarchy.

2. The apparatus according to claim 1, wherein said delay means delays at least one input signal of each multiplexer of the lowest hierarchy.

3. The apparatus according to claim 2, wherein said delayed input signal is a common clock signal of said lower hierarchy.

4. The apparatus according to claim 3, wherein said means for correlating phases includes an EXOR gate.

5. The apparatus according to claim 4, further comprising filter means coupled to the output of said means for correlating phases to filter said control signals.

6. The apparatus according to claim 5, wherein said filter means is an integrator.

7. An apparatus for correlating phases of a clock signal and data signals to adjust phase deviations, comprising:

a plurality of multiplexers of a first hierarchy being concatenated with at least one multiplexer of at least one higher hierarchy;

at least one circuit for correlating phases of a clock signal and data signals of said higher hierarchy, said at least one circuit generating control signals indicative of a phase deviation of said data signals to said clock signal of said higher hierarchy; and at least one delay element controlled by said control signals to adjust for the phase deviation of said data signals to said clock signal of said higher hierarchy, whereat said at least one delay element at least delays one input signal of each multiplexer of a lower hierarchy.

8. The apparatus according to claim 7, wherein said at least one circuit for correlating phases is disposed in said at least one multiplexer of said at least one higher hierarchy.

9. A method for correlating phases of a clock signal and data signals to adjust phase deviations in a network including multiplexers of a first hierarchy concatenated with multiplexers of at least one higher hierarchy, the method comprising:

generating control signals indicative of a phase deviation of said data signals to said clock signal of said higher hierarchy; and delaying, in response to said control signals, at least one input signal of each multiplexer of a lower hierarchy to adjust for the phase deviation of said data signals to said clock signal of said higher hierarchy.

* * * * *